Sept. 11, 1923.
R. COLOMBINO
INTERMEDIATE WIND SCREEN FOR MOTOR CARS
Filed Aug. 7, 1922
1,467,531
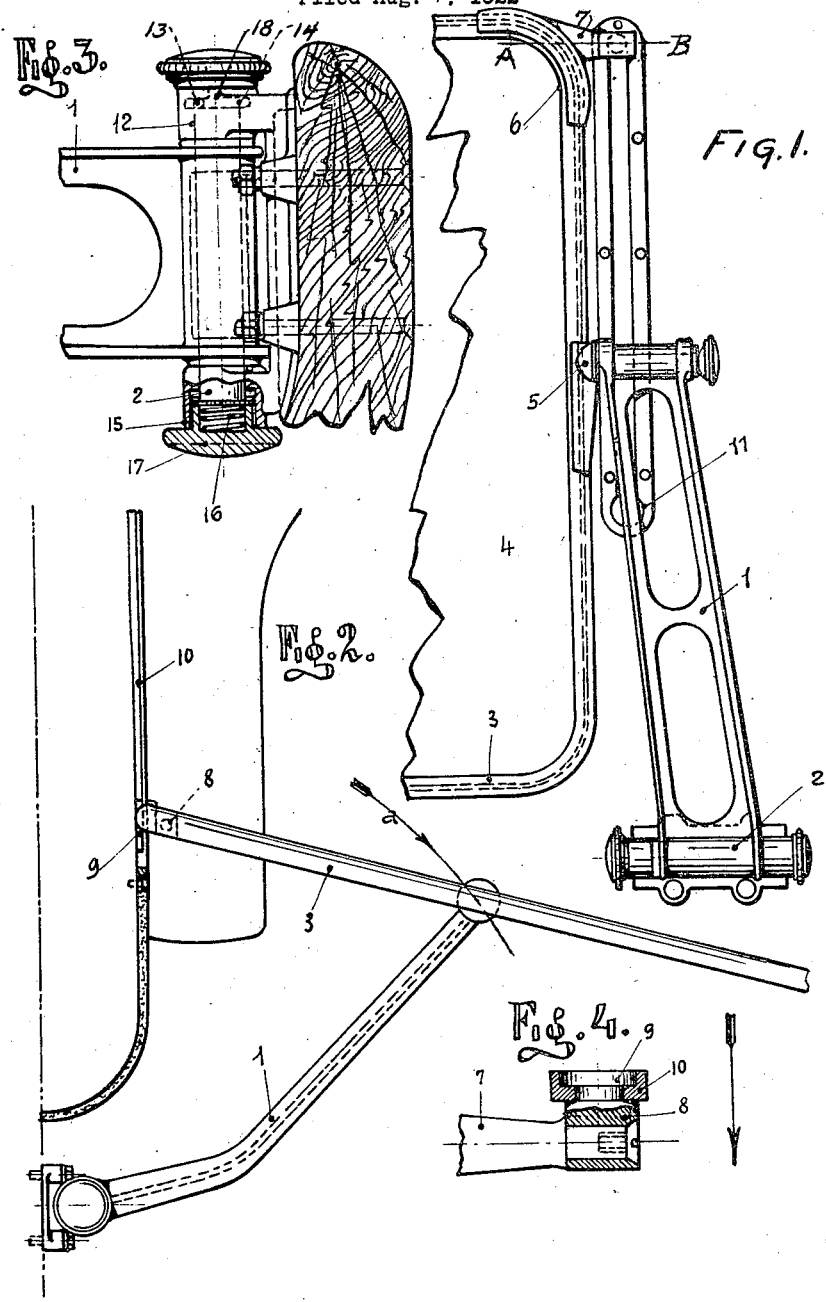

Patented Sept. 11, 1923.

1,467,531

UNITED STATES PATENT OFFICE.

RINO COLOMBINO, OF TURIN, ITALY.

INTERMEDIATE WIND SCREEN FOR MOTOR CARS.

Application filed August 7, 1922. Serial No. 580,181.

*To all whom it may concern:*

Be it known that I, RINO COLOMBINO, a subject of the King of Italy, and resident of 26 Via Pastrengo, Turin, in the Kingdom of Italy, have invented certain new and useful Improvements in Intermediate Wind Screens for Motor Cars; and I do hereby declare the following to be a full, clear, and exact description of the invention, such as will enable others skilled in the art to which it appertains to make and use the same, reference being had to the accompanying drawings and to letters or figures of reference marked thereon, which form a part of this specification.

This invention has reference to a wind screen, applicable to the back seats of motor cars which can be easily and rapidly fixed in any desired position, and which is rigidly held against the action of the wind and vibrations, without in any way hindering the use of folding seats.

According to this invention the intermediate wind screen is characterized by a rotatable arm pivoted on the body of the car and supporting a glass screen frame which turns on the said arm and is provided with a guide roller movably mounted in a guide fixed to the body of the car. The wind screen is brought to the working position when the arm is rotated.

In order that the invention may be more clearly understood reference is made to the annexed drawing which shows, by way of example, one construction of wind screen constituting the object of the invention.

Fig. 1 is a longitudinal view of the wind screen in its position of rest.

Fig. 2 is a plan view of the wind screen in its working position.

Fig. 3 is a detail of the pivot or hinge fixture to the body of the vehicle.

Fig. 4 is a detail of a movable guiding button.

Referring to the drawings:

An arm 1 is jointed to the body of the car by a pivotal member 2 and carries a frame 3, provided with a glass screen and which turns on the arm 1 by means of a hinged union 5. Fixed at the edge 6 of the frame 3 is a rod 7 to which is jointed a swivelling support 8 provided with a shouldered roller 9 sliding in a guide 10, suitably provided at one end with an entrance opening 11. The guide is fixed along the edge of the car body.

When the arm 1 is turned in the direction of the arrow *a* (Fig. 2) the frame 3 tends to follow it, and is prevented from doing so by the roller 9 engaging in the guide 10, with the result that the frame turns on itself and swivels, so that, at the end of its travel, it assumes a working position almost perpendicular to the axis of the car. In this position the pressure of the wind does not tend to make the wind screen return to the position of rest. In order to fix the screen in intermediate positions, an auxiliary locking arrangement may be provided.

The dismounting of the wind screen is facilitated by the pivot 2 fixed to the support 12 by the aid of a projection 13 engaging a bayonet socket 14 in the said support.

In order to prevent the pivot 2 disengaging by the effect of vibrations due to the movement of the car, a spring 16, supported by the threaded plug 17, is placed in the counter support 15 and acts on the pivot by causing the projection to engage with the bayonet socket. This arrangement, moreover, renders the dismounting easy for, as soon as the pivot is turned until the projection 13 comes opposite the entrance opening 18 of the bayonet socket, it is forced out by the spring 16.

In order to detach the frame 3 from the guide 10, it is sufficient to slide the roller along until it is opposite the enlarged entrance 11, where it can come out.

What I claim is:

1. A wind shield for motor vehicles, comprising a pivoted support, a screen member pivotally connected to the free end of the support, a fixed guide and means to adjustably connect the screen member to the guide.

2. A wind shield for motor vehicles comprising a pivoted horizontally movable arm, a screen frame pivotally connected between its ends to the free end of said arm, an arm fixed to the frame near one end of the latter, and a longitudinally slotted guide in which the fixed arm is adapted to slide.

3. A wind shield for motor vehicles comprising a pivoted horizontally movable arm, a screen frame pivotally connected between its ends to the free end of said arm, an arm fixed to the frame near one end of the latter, and a longitudinally slotted horizontally mounted guide in which the fixed arm is adapted to slide.

4. A wind shield for motor vehicles, comprising a bracket fixed on the body of the vehicle, a horizontally movable arm pivotally mounted in the bracket, a longitudinally slotted guide frame fixed on said body, a screen vertically mounted on the free end of said arm, and a slide fixed on the screen movably mounted in the guide.

5. A wind shield for motor vehicles, comprising a bracket fixed on the body of the vehicle, a coiled spring in the bracket, a pivot-pin in the latter normally depressing the spring, a bayonet-joint connection between the pin and bracket, and a horizontally disposed screen-supporting arm pivoted on said pin.

In testimony that I claim the foregoing as my invention, I have signed my name.

RINO COLOMBINO.